April 21, 1970

R. W. DRUSHEL 3,508,115

CIRCUIT FOR AND METHOD OF CURRENT RESPONSIVE
ELECTRONIC CONTROL

Filed Aug. 22, 1966

INVENTOR.
ROBERT W. DRUSHEL

BY
ATTORNEYS

United States Patent Office 3,508,115
Patented Apr. 21, 1970

3,508,115
CIRCUIT FOR AND METHOD OF CURRENT
RESPONSIVE ELECTRONIC CONTROL
Robert W. Drushel, Farmington, Mich., assignor to Ex-Cell-O Corporation, Detroit, Mich., a corporation of Michigan
Filed Aug. 22, 1966, Ser. No. 573,999
Int. Cl. H02h 3/08, 7/00; G08b 21/00
U.S. Cl. 317—27                               12 Claims

ABSTRACT OF THE DISCLOSURE

A circuit for and method of cutting off an electrical machining circuit in response to an excessive current in the circuit. The circuit includes a shunt positioned in the electrical machining circuit, a double ended differential amplifier connected across the shunt and a pair of emitter followers connected to the output of the differential amplifier collectively operable to provide a single ended output signal proportional to the current in the shunt, structure for providing an adjustable maximum current limit reference signal and compare it to the single ended output to provide a trip signal in response to the current in the shunt reaching a predetermined selected value in relation to the maximum current limit reference signal and an electronic switch, a unijunction transistor oscillator, isolating transformer and silicon controlled rectifier connected in series to provide an output control signal in response to the trip signal.

---

It is often desirable to turn electrical apparatus off as soon as possible after occurrence of a particular value, variation or rate of variation of an electrical parameter of the apparatus. Thus, for example, in electrochemical machining sparks or arcs such as may occur on rear short circuiting or short circuiting of the tool and workpiece associated with the apparatus for such machining are particularly detrimental and may completely ruin a workpiece in a fraction of a second. In such apparatus it is necessary to provide a control circuit which will cut off the machining power as soon after a shorted condition is established as possible.

It is therefore an object of the present invention to provide an improved electrical parameter responsive control circuit.

Another object is to provide an electronic control circuit which will operate within a few microseconds of sensing of an undesired electrical parameter.

Another object is to provide a control circuit as set forth above which is responsive to a predetermined maximum current in an electrical circuit.

Another object is to provide a control circuit as set forth above including means for selecting the predetermined maximum current to which the control circuit is responsive.

Another object is to provide an electronic control circuit including means for sensing the current passing through an electric circuit and developing an electric signal proportional to the current, means for comparing the developed electric signal with a reference electric signal and for tripping a switch when the compared signals have a predetermined relation, and means including an oscillator responsive to tripping of the switch and control signal producing means responsive to the oscillator for cutting off the current in the electric circuit at a predetermined maximum current value.

Another object is to provide a control circuit as set forth above in conjunction with electrical machining apparatus.

Another object is to provide a control circuit as set forth above which is completely solid state and is simple in construction, economical to manufacture and efficient in use.

Other objects and features of the invention will become apparent as the description proceeds, especially when taken in conjunction with the accompanying drawings, illustrating a preferred embodiment of the invention, wherein.

With particular reference to the figures of the drawings, one embodiment of the present invention will now be considered in detail.

Figure 1:
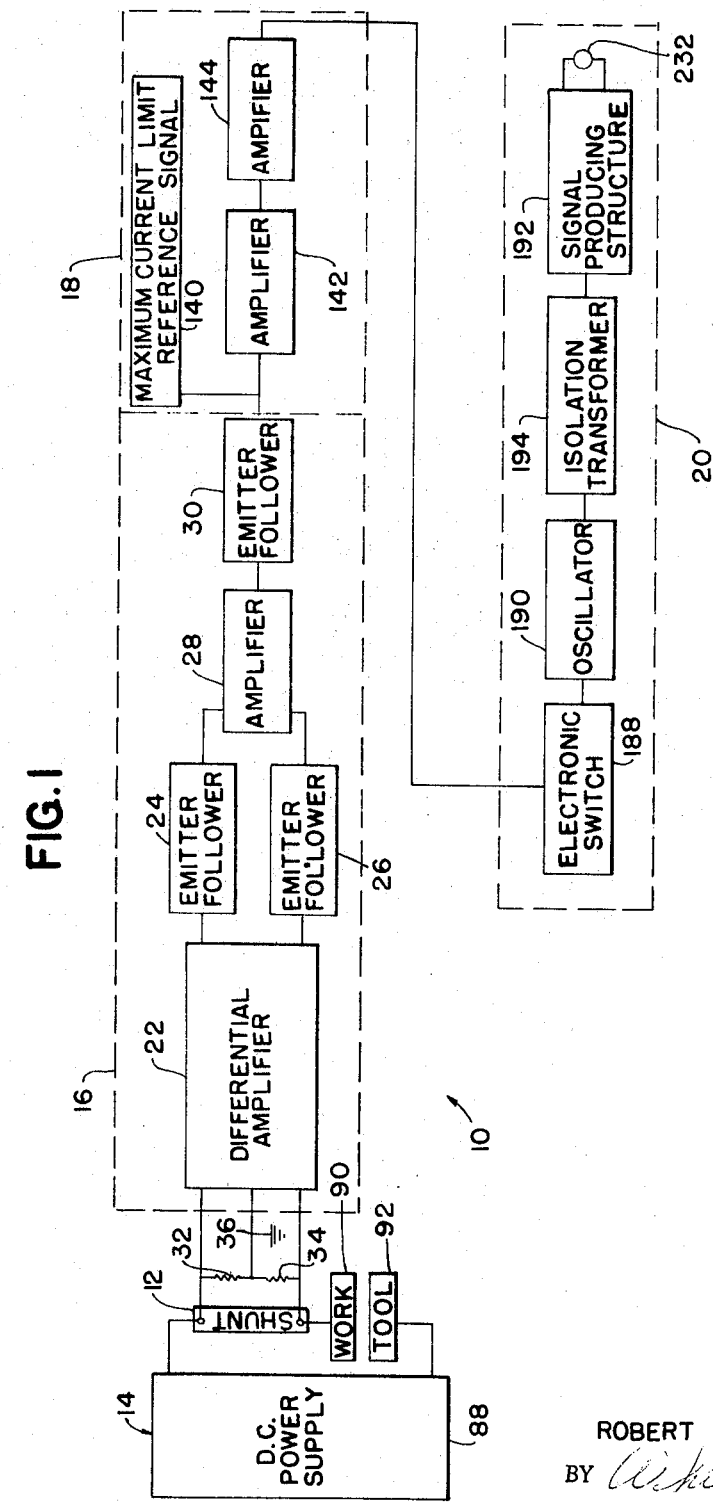
FIGURE 1 is a block diagram of an electronic control circuit constructed in accordance with the invention in combination with electrical machining apparatus.

As shown in FIGURE 1, the electronic control circuit 10 is connected across a shunt 12 placed in the machining circuit of electrical machining apparatus 14. The control circuit 10 includes structure 16 for sensing the magnitude of the current through the shunt 12 and producing an electric signal proportional thereto, structure 18 for providing a reference electric signal, comparing the electric signal from the structure 16 with the reference electric signal and producing an output signal when the reference electric signal and electric signal from the structure 16 have a predetermined relation, and structure 20 for producing a control electric signal in response to the output signal from the structure 18.

In operation, with the electrical machining apparatus 14 operating, a signal representative of the current through the shunt 12 will be produced by the structure 16. The signal from the structure 16 will be compared with a selected reference signal in the structure 18, and if the current through the shunt 12 exceeds a predetermined maximum in accordance with the selected reference signal, a trip signal will be provided by the structure 18 to actuate the structure 20 which in turn will produce a control signal that may be used to turn off the electrical machining apparatus 14 and indicate excess current through the shunt 12.

The control circuit 10 operates in a very short time which may be measured in microseconds from the time of sensing of excess current through the shunt 12 until a control signal to cut off the power to the electrical machining apparatus 14 is produced.

More specifically, the electrical machining apparatus 14 may be electro-chemical machining apparatus and includes a direct current power supply 88 for supplying for example zero to twenty volts at up to ten thousand amperes between the work 90 and tool 92 which are connected in series with the power supply 88, as shown in FIGURE 1. The power supply with which the control circuit 10 is associated may have substantially any voltage and current parameters with suitable adjustment of the electrical parameters of the control circuit so that the power supply is not limited to twenty volts and to ten thousand amperes. An electrolyte is maintained between the work 90 and tool 92 which are in controlled spaced apart relation in operation. Such electro-chemical machining apparatus are well known and will not therefore be considered in greater detail herein.

The shunt 12 as shown is a zero to fifty millivolt calibrated shunt, but may be of any desired value if the rest of the circuit 10 is adjusted to suit the level of the shunt. Shunt 12 is placed in series on the machining circuit of apparatus 14 in parallel with a pair of matched resistors 32 and 34 which are connected at one end as shown to provide a common point 36 which is an electric common point for the control circuit 10. The common point 36 is not ground for the apparatus 14 nor is it actual ground potential. The point 36 however establishes a center potential about which the signal from the shunt 12 fed to the structure 16 varies equally in opposite directions.

As shown in FIGURE 1, the structure 16 for sensing the magnitude of the current through the shunt 12 and producing an electric signal proportional thereto includes a differential amplifier 22, two emitter followers 24 and 26, a single ended amplifier 28, and the emitter follower 30.

Figure 2:
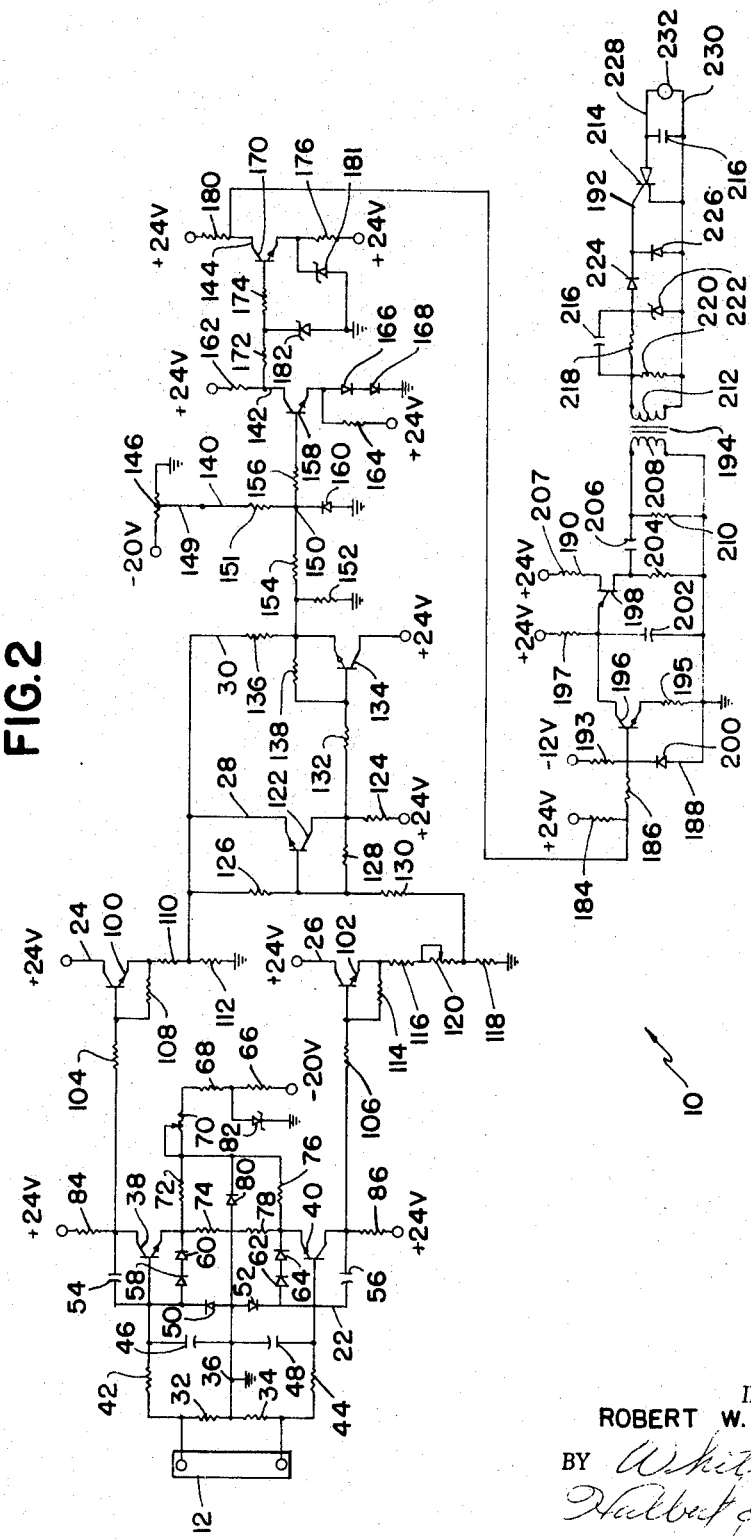
FIGURE 2 is a schematic diagram of the control circuit illustrated in FIGURE 1.

The differential amplifier 22 as shown in greater detail in FIGURE 2 includes transistor portions 38 and 40 which are included in the same housing physically so that the differential amplifier 22 is temperature compensated with respect to the transistor portions 38 and 40. The bases of the transistor portions 38 and 40 are driven by the signals developed across the resistors 32 and 34 through the current limiting resistors 42 and 44 and across the filter capacitors 46 and 48. Resistors 42 and 44 prevent excess current from appearing at the base of the transistor portions 38 and 40, while the capacitors 46 and 48 prevent sharp voltage spikes from appearing on the bases of the transistor portions 38 and 40.

Diodes 50 and 52 are provided to limit the reverse voltage spikes which might appear at the bases of the transistor portions 38 and 40 due to the signal across the shunt 12, which may be very erratic, to a value which is safe for the transistor portions 38 and 40. Capacitors 54 and 56 provide some filter action between the collectors and bases of the transistor portions 38 and 40, whereby spikes appearing on the bases of transistor portions 38 and 40 will not be amplified and passed on to the emitter followers 24 and 26. The series diodes 58 and 60 and 62 and 64 limit the base to emitter signal which is permitted on the transistor portions 38 and 40 to a safe value.

Bias for the transistor portions 38 and 40 is provided through a voltage divider network including the series resistors 66 and 68 in series with the variable resistor 70. The variable resistor 70 is in turn connected in series with the parallel combination of the resistors 72 and 74 and resistors 76 and 78 and the diode 80 in the emitter circuits of transistor portions 38 and 40, as shown in FIGURE 2. The emitters of the transistor portions 38 and 40, as shown in FIGURE 2, are connected between the resistors 72 and 74 and the resistors 76 and 78.

The Zener diode 82 regulates the voltage from a minus twenty volt electric power source to provide a steady minus ten volts between resistors 66 and 68. The resistors 84 and 86 connected between a plus twenty-four volt electric power source and the collectors of the transistor portions 38 and 40 operate to provide a potential, for example twelve volts about which the collectors of the transistor portions 38 and 40 swing in response to variation in the current through the shunt 12.

In operation of the differential amplifier 22 an electric signal which is representative of the total current passed from the power supply 88 of the electrical machining apparatus 14 through the series circuit including the work 90, the gap between the work 90 and the tool 92, which may vary in a random fashion, will be felt across the shunt 12 and resistors 32 and 34 and consequently on the bases of the transistor portions 38 and 40 to provide a swing of the voltage on the collectors of the transistor portions 38 and 40 in opposite directions of an equal amount.

The exact operating point of the transistor portions 38 and 40 will be determined by the setting of the variable resistor 70 which will vary the current through the diode 80. The diode 80 is not a regulating diode but the current through the diode 80 will vary sufficiently on variation of the resistor 70 to provide a vernier regulation of the operating point of the transistor portions 38 and 40. Diode 80 also stabilizes the operating point of the transistor portions 38 and 40 in conjunction with the Zener diode 82.

The input to and consequently the output of the differential amplifier 22 is further filtered and stabilized by the resistors 42, 44, capacitors 46, 48, 54 and 56, and diodes 50 and 52 as set forth above. Thus, the signal output on the collectors of the transistor portions 38 and 40 of the differential amplifier 22 will be relatively stable signals of a magnitude varying in accordance with the current through the shunt 12 in opposite directions.

The signals at the collectors of the transistor portions 38 and 40 are fed to the bases of the transistors 100 and 102 of the emitter followers 24 and 26 through the current limiting resistors 104 and 106. A positive twenty-four volt power source is connected to the collectors of transistors 100 and 102 as shown. The desired operating characteristics of the emitter follower 24 and output load thereof is determined by the voltage divider including the resistors 108, 110 and 112 connected in series to electronic common established at 36. Similarly the proper operating characteristics and load are determined for the emitter follower 26 by the voltage divider including the resistors 114, 116 and 118 and the variable resistor 120 connected in series, as shown in FIGURE 2, and to electronic common.

The emitter followers 24 and 26 in operation provide a buffer for the differential amplifier 22 to prevent the rest of the control circuit 10 from affecting the operation of the differential amplifier. In addition the emitter followers 24 and 26 provide a relatively stiff voltage source and uniform load for the single ended amplifier 28 receiving the output from both of the emitter followers 24 and 26, as shown in FIGURE 2.

The single ended amplifier 28 includes the transistor 122 connected in the amplifying circuit shown in FIGURE 2 with the load resistor 124 and resistors 126 and 128. The collector of the transistor 122 is connected to the twenty-four volt source of electric energy through resistor 124. The output signal of the emitter follower 24 is applied to the emitter of the transistor 122, while the output signal from the emitter follower 26 is applied to the base of the transistor 122 through the resistor 130 to provide an emitter base bias and therefore an output signal across the load resistor 124 from the amplifier 28 which is proportional to the current through the shunt 12. The operating range of the single ended amplifier 28 is established by the setting of the variable resistor 120 of the emitter follower circuit 26.

The output signal from the amplifier 28 is a single ended output with reference to electronic common established at 36 which is amplified with respect to the signals received from the differential amplifier 22 through the emitter followers 24 and 26. The signal from the amplifier 28 is passed through the current limiting resistor 132 to the base of the transistor 134 of the emitter follower 30 connected in the usual configuration with load resistor 136 and resistor 138. The emitter follower 30 again provides a buffer for the amplifier 28 so that it will not be affected by later circuit components. The emitter follower 30 is connected at the collector of transistor 134 to the plus twenty-four volt source of electric energy and operates with a normal swing of between seven and twenty-one volts positive at the emitter due to variation of current through shunt 12.

As indicated above, the function of the structure 16 including the differential amplifier 22, emitter followers 24 and 26, the single ended amplifier 28 and emitter follower 30 is to sense variations in current through the shunt 12 and provide a single ended output proportional thereto which is relatively stable.

The structure 18 for providing a reference electric signal, comparing the reference signal with the signal from the structure 16 and producing an output signal when the reference signal and signal from the structure 16 have a predetermined relation for actuating the structure 20, as shown in FIGURE 2, includes the adjustable maximum current limit reference signal source and comparing structure 140 and the amplifiers 142 and 144.

The maximum current limit reference signal source and comparing structure 140 includes the variable resistor 146 connected between electronic common and a minus twenty volt source of electric energy. A selected point on the variable resistor 146 is tapped through the wiper arm 149 to provide a reference signal at the point 150 through resistor 151. The signal from the emitter follower 30 is passed across the resistor 152 through the current limiting resistor 154 to the point 150 where this positive signal is compared with the negative signal from the reference signal source. The resultant signal is applied through the resistor 156 to the base of the transistor 158 of amplifier 142. Diode 160 is provided to limit negative signals at the point 150 to prevent damage to the amplifying transistor 158 which is a positive base transistor and may be damaged by a relatively small negative potential at the base thereof.

The collector of the transistor 158 is connected through a load resistor 162 to the twenty-four volt positive power source, while the emitter of the transistor 158 is connected through a resistor 164 to the same twenty-four volt positive power source to provide a small positive bias on the emitter, such as 1.2 volts regulated by the series diodes 166 and 168. Amplifier 142 is normally on due to the circuit constants and the bias applied to transistor 158. Transistor 158 is such that a very small negative voltage, such as two-tenths of a volt on the base will turn the transistor 158 off.

It will now be recognized that depending on the reference voltage selected at the resistor 146 which is passed to the point 150 and the output voltage of the emitter follower 30, a point may be reached at which the current through the shunt 12 is such that the output signal from the emitter follower 30 at the point 150 is positive but of a lesser value than the negative reference signal from the resistor 146 due to an undesirably great current flow through the shunt 12 so that a negative bias will be provided at the transistor 158 to turn the transistor off. The current value through the shunt 12 at which turning off of the transistor 158 is accomplished may be adjusted by the setting of the wiper arm 149 of the variable resistor 146 to provide operation of the control circuit 10 at substantially any selected value of current through the shunt 12.

When the transistor 158 is turned off by a negative potential applied to the base thereof, the collector of the transistor 158 rises sharply from approximately plus 1.5 volts toward the positive twenty-four volt source of electric energy connected thereto through load resistor 162 to provide a large positive swing of the signal applied to the base of transistor 170 of amplifier 144 through resistances 172 and 174. The large positive signal on the base of the transistor 170, which has been biased in an off condition by the connection of the emitter thereof through resistor 176 to the positive twenty-four volt energy source and the Zener diode 181 which maintains substantially three volts on the emitter of the transistor 170, causes the amplifier 144 to turn on. Turning on amplifier 144 provides a substantial drop in the voltage output across the load resistor 180 which, as indicated, is connected again to the positive twenty-four volt source of electric energy. The Zener diode 182 in the base circuit of the transistor 170 is to prevent large positive signals from injuring the transistor 170.

The output of the amplifier 144 is actually across the resistances 180 and 184 in parallel and through the current limiting resistor 186. The resistor 180 is provided to permit testing of the structures 16 and 18 when the structure 20 is not connected thereto. The effective load of the amplifier 144 connected as illustrated in FIGURE 2 is through the resistance 184 which is considerably smaller than the resistor 180.

Thus the structure 18 receives a signal proportional to the current through the shunt 12, compares it to a reference signal and provides an output signal across the resistors 180 and 184 and through the resistor 186 when the signal proportional to the current through the shunt is larger than desired as determined by the selection of the reference signal value. This output signal is the result of a rapid change from a large positive signal at the collector of transistor 170 to a substantially lesser positive signal at this collector in a very short time.

The structure 20 for receiving the signal from the structure 18 indicating a current through the shunt 12 in excess of the desired current and producing a control electric signal output in response thereto includes the electronic switch 188, the oscillator 190, and signal producing means 192. The switch 188 is responsive to the output signal from the structure 18 to start the oscillator oscillating, while the oscillator 190 is responsive to the switch 188 to provide rapid pulses for actuating the signal producing means 192 which is responsive thereto and isolated therefrom by the isolation structure 194.

The switch 188 includes the transistor 196 which is biased by the resistor 193 connected to the minus twelve volt electric energy source and the base of the transistor 196, rectifier 200 connected between the base of transistor 196 and electronic common, resistor 195 and resistor 197 connected between the positive twenty-four volt source of electric energy and the collector of transistor 196 to be normally turned on and therefore supply a substantial short between the emitter of the unijunction transistor 198 of the oscillator 190 and electronic common. Thus, the unijunction transistor 198 is normally held in an off condition. The diode 200 is provided to regulate the voltage applied to the base of the transistor 196 to prevent harm to the transistor 196.

When the large positive potential from the amplifier 144 on the base of the transistor 196 is removed due to conducting of the transistor 170 in response to an excessive current through the shunt 12, the transistor 196 is turned off by the negative bias source through resistor 193. Thus, the oscillator 190 which will oscillate at a frequency determined by the time constant of the resistor 197 and capacitor 202 will proceed to oscillate and provide a pulsed output of, for example one pulse every one hundred fifty microseconds across the resistor 204 through the coupling capacitor 206 to the primary winding 208 of the isolating transformer 194 which is loaded by the resistor 210.

Operation of the unijunction oscillator 190 is normal in that the capacitor 202 will charge through the resistance 197 until the base of the unijunction transistor 198 reaches a potential sufficient to cause the transistor 198 to conduct at which time the capacitor 202 is discharged through the unijunction transistor 198 now conducting and the resistance 204. Discharging of the capacitor 202 will reduce the bias on the base of the unijunction transistor 198 and turn off the oscillator 190 whereby the capacitor 202 will again charge to restart the oscillating cycle.

The resistance 207 is chosen to provide a desired operating level for the transistor 198 and is again connected to the positive tweny-four volt source as is the amplifier 196. Thus, pulses are produced in the primary winding 208 of the transformer 194 at a selected frequency established by the time constant of resistor 197 and capacitor 202.

The pulses from the oscillator 190 are fed through the secondary winding 212 of the transformer 194 to the control signal producing means 192 including the silicon controlled rectifier 214. The control signal producing means 192 further includes the filter circuit comprising capacitor 216 and resistor 218, the load resistor 220 for the secondary winding 212 of transformer 194, the Zener diode 222 for limiting the signal fed to the silicon controlled rectifier 214 which is relatively small and may be damaged by too high an input signal from the transformer 212 and the regulating diodes 224 and 226.

In operation the silicon controlled rectifier 214 should be turned on by the first pulse of the oscillator 190 and remain turned on until the power source (not shown) connected to the rectifier 214 over conductors 228 and 230 is removed therefrom. If the silicon controlled rectifier 214 should not be turned on by the first pulse from the oscillator 190 it will be only a matter of a few microseconds before another pulse from the oscillator 190 should arrive at the silicon controlled rectifier 214 to turn it on. Thus, with the structure illustrated, every one hundred fifty microseconds a pulse from oscillator 190 should arrive at the silicon controlled rectifier 214 to assure an output signal therefrom as long as the excessive current condition exists through the shunt 12.

The output of the silicon controlled rectifier 214 over the capacitor 216 may be used in any required manner to reduce the current through the shunt 12 and subsequently disconnect the power source from the silicon controlled rectifier 214 to cut off the output signal thereof and condition the circuit 10 for additional operation. In the instant application the output of the silicon controlled rectifier 214 may, for example, be used to operate a switching device 232 operable to cut off electric energy passed to the power supply 88 of the electrical machining apparatus 14 and thus cut off the current through the shunt 12 and to illuminate a light indicating that the power supply has been shut off due to excessive current through the shunt 12. Also, the switching device 232 may through a time delay cut off the electric signal supplied to the silicon controlled rectifier 214 if desired after the power supply 88 has been turned off.

Thus, in overall operation of the control circuit 10, it is assumed that the electrical machining apparatus 14 is machining normally with the current through the shunt 12 producing a signal through the differential amplifier 22, buffers 24 and 26, single ended amplifier 28 and the emitter follower which varies normally for example, from a positive seven to a positive twenty-one volts.

With the reference signal from the resistor 146 set for example at seven volts negative, the combined signal at the base of the transistor 158 will be positive at all times and the transistor 158 will be turned on. When the current through the shunt 12 exceeds a value sufficient to drive the signal from the emitter follower 30 below seven volts positive, a negative potential will appear on the base of the transistor 158 and the transistor will immediately turn off.

Turning off of the transistor 158 will produce a large positive potential on the base of the transistor 170 to turn this transistor on and drop the positive voltage on the base of the transistor 196 to a substantially less positive value, whereby the normally on transistor 196 is biased sharply off by the negative potential applied through resistor 193 to the base of the transistor 196.

The cutting off of the transistor 196 removes the substantial short from the emitter of the unijunction transistor 198 whereby the oscillator circuit 190 will provide pulses at a frequency of one every one hundred fifty microseconds. These pulses are transmitted through the isolating transformer 194 to trigger the silicon controlled rectifier 214 into an on condition, whereby the switch 232 is actuated to control the circuit of the power supply 88 and remove the current through the shunt 12 and between the work 90 and tool 92.

The entire operation of the control circuit 10 may require between one hundred and fifty and two hundred microseconds. This time could be considerably shorter depending on the circuit constants chosen. Thus, on excessive current through the shunt 12, the power to the electrical machining apparatus 14 is turned off before any substantial damage can be done to a workpiece.

While one embodiment of the electronic control circuit of the invention has been considered in detail, it will be understood that other embodiments and modifications are contemplated by the inventor. Also, it is not necessary that the current responsive control circuit 10 of the invention be used in conjunction with electrical machining apparatus as it has general application to any circuit in which it is desired to sense current above a selected level and produce an output signal in response thereto in an extremely short time in the nature of a few microseconds.

What I claim as my invention is:

1. An electronic control circuit comprising means for sensing current in an electric circuit and developing an electric signal proportional thereto, means for providing a selectable reference signal, means connected to the means for developing an electrical signal proportional to the sensed current and to the means for providing a reference signal for comparing the developed signal and reference signal operable to provide a trip signal when the developed signal and reference signal have a predetermined relation, an electronic switch responsive to the trip signal developed when the developed signal and reference signal have a predetermined relation, an oscillator connected and responsive to the switch for oscillating in response to tripping of said switch and means responsive to oscillation of the oscillator for providing a control signal for the electric circuit.

2. Structure as set forth in claim 1 wherein the means for sensing current in the electric circuit comprises a shunt in the electric circuit, a differential amplifier connected across the shunt for developing a pair of oppositely directed output signals variable in proportion to current through the shunt and a single ended amplifier driven by the output signals of the differential amplifier to provide a single ended output signal representative of the current through the shunt.

3. Structure as set forth in claim 1 wherein the means for comparing the developed signal and reference signal operable to provide a trip signal comprises a first normally on amplifier, means for feeding the developed signal and reference signal to the first amplifier to turn the first amplifier off on the predetermined relation between the developed signal and reference signal being established, and a second normally off amplifier operably connected to the first amplifier to be turned on in response to turning off of the first amplifier to trip the electronic switch.

4. Structure as set forth in claim 1 wherein the oscillator is a unijunction transistor oscillator and the electronic switch is connected to short the base of the oscillator when the switch is not tripped.

5. Structure as set forth in claim 1 wherein the means for providing a control signal for the electric circuit includes a silicon controlled rectifier connected to the output of the oscillator for providing an output electric signal on oscillation of the oscillator.

6. Electrical machining apparatus including a power supply, a workpiece and a tool connected in series in a machining power circuit with a machining gap between the tool and workpiece, an electrical shunt connected into the power circuit so that current proportional to the total current in the machining power circuit flows through the shunt, a differential amplifier connected across the shunt for providing oppositely directed electrical output signals proportional to the magnitude of current passing through the shunt, a pair of emitter followers connected to the output of the differential amplifier for isolating the differential amplifier, a single ended amplifier for receiving the output of the pair of emitter followers and providing a single ended amplifier output proportional to the current through the shunt, an emitter follower receiving the output of said single ended amplifier for isolating the single ended amplifier, means for supplying a reference electrical signal, means for comparing the reference electrical signal and the signal from the last mentioned emitter follower to provide an electrical signal in response to the current through the shunt reaching a predetermined value, a pair of series connected amplifiers connetced to receive the output of the means for comparing the reference electrical signal and the electrical signal from the last mentioned emitter follower and providing a trip signal when the compared signals have a predetermined relation, an electronic switch connected to the last of the series connected amplifiers for tripping by the trip signal, a unijunction oscillator connected to the electronic switch for oscillation on tripping of the electronic switch, a silicon controlled rectifier responsive to the unijunction oscillator for providing an output control signal on oscillation of the oscillator, and an isolation transformer positioned between the unijunction oscillator and the silicon controlled rectifier.

7. In an electrical machining circuit, a shunt positioned in the circuit receiving a current proportional to the current in the circuit and means for developing an electrical signal proportional to the current in the shunt and controlling the machining circuit in accordance therewith, comprising signal developing means for substantially immediately developing a double ended signal proportional to the signal through the shunt, means for receiving the double ended signal developed and providing a single ended output signal therefrom, means for developing a maximum current limit reference signal and means connected to receive both the maximum current limit reference signal and the single ended output signal and for providing a trip signal output in response to the difference between the maximum current limit reference signal and the single ended output signal indicating an excessive current through the shunt and means for receiving the trip signal and providing a signal for controlling the machining circuit in response thereto.

8. Structure as set forth in claim 7, wherein the means for developing a double ended signal comprises a differential amplifier connected across the shunt and emitter followers connected to the differential amplifier for isolating the differential amplifier, and the means for providing a single ended output signal comprises an amplifier connected to the emitter followers for receiving the double ended signal and an emitter follower connected to the single ended amplifier for isolating the single ended amplifier.

9. Structure as set forth in claim 7, wherein the means for providing a trip signal output includes amplifier means for receiving the single ended output signal and the maximum current limit reference signal and comparing them and for providing a trip signal when the maximum current limit reference signal has a predetermined relation to the single ended output signal.

10. Structure as set forth in claim 7, wherein the means for receiving the trip signal and providing a control signal in response thereto includes an oscillator, an electronic switch operable in response to the trip signal for turning the oscillator on, a signal producing circuit responsive to turning on of the oscillator and an isolation circuit connected between the oscillator and signal producing circuit.

11. A circuit for sensing current through a shunt comprising a voltage divider in parallel with the shunt, a double ended differential amplifier connected to the voltage divider for providing a double ended output signal proportional to the current through the voltage divider, a pair of emitter follower circuits connected to receive the output of the double ended amplifier for isolating the double ended amplifier, a single ended amplifier connected to the emitter follower circuits for providing a single ended output signal proportional to the current through the voltage divider in response to the double ended output of the double ended amplifier and an emitter follower circuit connected to the single ended amplifier for isolating the single ended amplifier.

12. The method of controlling an electrical machining circuit in response to an excessive current in the circuit, comprising developing a double ended signal proportional to the current in the circuit, developing a single ended output signal from the double ended signal, developing a maximum current limit reference signal, comparing the signal ended output signal and the maximum current limit reference signal and providing a trip signal output in response to a predetermined relation between the maximum current limit reference signal and the single ended output signal, actuating an oscillator in response to the trip signal and providing an output signal in response to oscillation of the oscillator for controlling the electrical machining circuit.

References Cited

UNITED STATES PATENTS

| | | | |
|---|---|---|---|
| 3,173,078 | 3/1965 | Farnsworth | 317—33 X |
| 3,174,094 | 3/1965 | Farnsworth et al. | 317—33 X |
| 3,321,641 | 5/1967 | Howell | 317—33 X |
| 3,355,653 | 11/1967 | Paradissis | 321—18 |
| 3,372,343 | 3/1968 | Tompkins | 330—20 |
| 3,389,325 | 6/1968 | Gilbert | 317—31 X |

LEE T. HIX, Primary Examiner

W. H. BEHA, Jr., Assistant Examiner

U.S. Cl. X.R.

317—31, 33; 340—253